Figure 1:
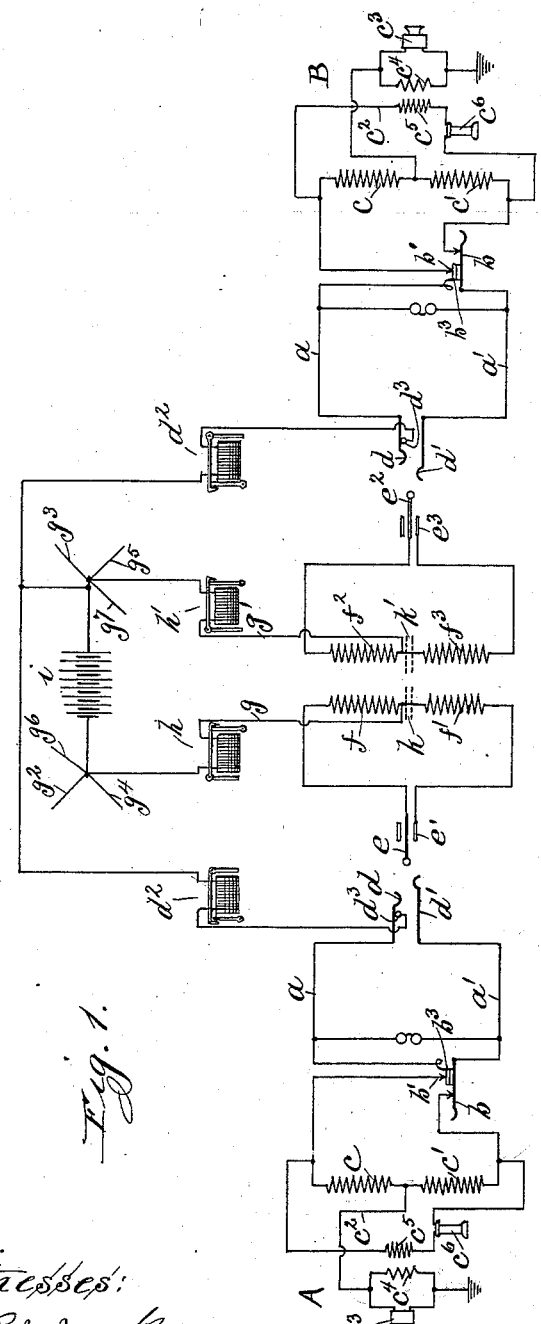

No. 657,338. Patented Sept. 4, 1900.
W. W. DEAN.
CENTRAL BATTERY TELEPHONE SYSTEM.
(Application filed Apr. 28, 1899.)

(No Model.)

Witnesses:
W. J. Jacker
Percy C. Gill

Inventor:
William W. Dean
By Ludington & Jones
Attorneys.

UNITED STATES PATENT OFFICE.

WILLIAM W. DEAN, OF CHICAGO, ILLINOIS, ASSIGNOR TO THE KELLOGG SWITCH BOARD AND SUPPLY COMPANY, OF SAME PLACE.

CENTRAL-BATTERY TELEPHONE SYSTEM.

SPECIFICATION forming part of Letters Patent No. 657,338, dated September 4, 1900.

Application filed April 28, 1899. Serial No. 714,870. (No model.)

*To all whom it may concern:*

Be it known that I, WILLIAM W. DEAN, a citizen of the United States, residing at Chicago, in the county of Cook and State of Illinois, have invented a certain new and useful Improvement in Central-Battery Telephone Systems, of which the following is a full, clear, concise, and exact description, reference being had to the accompanying drawings, forming a part of this specification.

My invention relates to a central-battery telephone system, my object being to provide a system whereby a common battery or source of charging-current at the central station may be connected in circuit with the telephone-line to charge the microphone or talking-circuit at the substation, whereby the separate batteries or sources of electricity at the substation may be dispensed with.

In accordance with my invention I provide a plurality of telephone-lines, each having two limbs to constitute a metallic talking-circuit, each line being connected or associated at the substation with a third conductor, which may be the ground or other suitable conductor, and at the central station I provide a common battery or source of electricity connected with the devices thereat employed for uniting the telephone-lines in talking-circuit, the said source of electricity being arranged to be connected in a circuit including in series said third conductor and the two telephone-lines, whereby the source of electricity will send current over the said circuit to charge the microphone-circuit. I preferably employ in the said circuit a microphone and the primary of an induction-coil, said microphone and primary being included in parallel paths of the circuit, while the secondary of the induction-coil is connected between the two limbs of the metallic circuit. I preferably unite the lines at the central station through repeating-coils, whereby each line forms a separate and distinct circuit for the talking-currents. The source of electricity will be connected between the telephone-lines at the central station and is preferably connected between the electrical centers of the windings of the repeating-coils. The current from the source of electricity may traverse the two limbs of each line in parallel; or one limb of each line may be alone employed for the passage of the charging-current. In order to prevent the variations of current upon one pair of connected lines from interfering with any other pair connected with the common source of current, I employ a resistance, preferably a reactive or impedance coil, interposed between the source of electricity and each of the connected telephone-lines. In this manner the variation of current upon any connected pair of lines is prevented from affecting any other pair of connected telephone-lines.

I have illustrated my invention in the accompanying drawings, in which—

Figure 2:
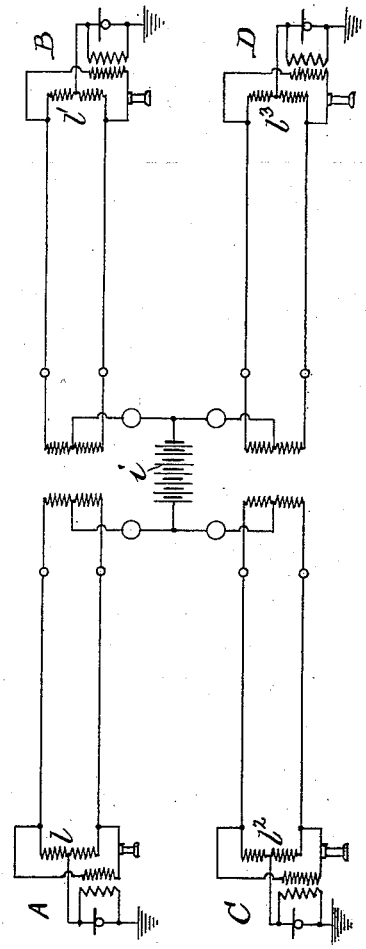

Figure 1 is a diagram illustrating my invention. Fig. 2 is a diagram illustrating the manner of connecting the common battery with a plurality of pairs of telephone-lines.

Like letters refer to like parts in both figures.

The telephone-line extends in two limbs $a$ $a'$ from the substation to the central station, and the telephone-hook $b$ is interposed in one of the limbs $a'$ and is adapted to rest against a back contact when the receiver is removed from the hook, and a contact $b'$, controlled by the telephone-hook, is adapted to engage a contact $b^3$ to close limb $a$ during conversation. At the substation the limbs $a$ and $a'$ are connected, respectively, with the impedance and balancing coils $c$ and $c'$, and from the electrical center of these coils extends the leg $c^2$, in which is connected the transmitter-circuit, which in the present instance is illustrated as consisting of a microphone $c^3$ in one of two parallel paths and the primary $c^4$ of an induction-coil in the other path. The secondary $c^5$ of the induction-coil is connected between the limbs $a$ and $a'$ and also includes the receiver $c^6$. At the central station the limbs $a$ and $a'$ terminate in the line springs or contacts $d$ $d'$ of the switch-socket. The individual annunciator $d^2$ is connected between the contact $d^3$ and the pole of the charging-battery $i$, so that the insertion of the plug disconnects the individual annunciator in the usual manner. The connecting-plugs at the central station are provided with contacts $e$ $e'$ and $e^2$ $e^3$, respectively, whereby two telephone-lines may be united together for conversation. Interposed in the cord-circuit are the windings $ff'$ and $f^2f^3$ of the repeating-coils, and from the electrical center of the coils $ff'$ a conductor $g$ extends to one pole of the battery $i$ and contains the clearing-out annunciator $h$, while from the electrical center of the windings $f^2f^3$ a conductor $g'$ extends to the opposite pole of the battery $i$ and includes the clearing-out annunciator $h'$. Similar conductors $g^2 g^3$ and $g^4 g^5$ and $g^6 g^7$ extend from the opposite poles of the battery $i$ to other cord-connectors for joining together the telephone-lines whereby the battery $i$ may be utilized for a plurality of pairs of connected telephone-lines. The apparatus and circuits of the substations A and B are similar and have been indicated by the corresponding reference-letters.

The apparatus for sending signals from the central station to the substation may be of any of the usual forms and for clearness has been omitted.

I have illustrated in dotted lines condensers $k k'$, inserted in the windings of the repeating-coils at the central station in order that the charging-current from the battery $i$ may traverse only one of the two limbs of the metallic talking-circuit. When it is desired to utilize both limbs of the talking-circuit for the charging-current, the condensers may be omitted.

Supposing subscriber A desirous of conversation, he removes his telephone-receiver from the hook $b$, thus closing the metallic limbs and closes the circuit from ground at the substation through the microphone-circuit, conductor $c^2$, limb $a$, contact $d^3$, annunciator $d^2$, and battery $i$ to ground, which will be provided by any telephone-lines which are connected for conversation and which are in circuit with the battery $i$. Since more or less of the telephone-lines are continuously in circuit, the ground thus produced may be relied upon for calling-currents. Other methods of signaling the central station may, however, be employed when desired. The operator inserts the calling-plug in the socket of subscriber A and inserts the opposite plug of the pair in the socket of subscriber B, and after subscriber B responds and removes his telephone from its hook the two subscribers are connected together for conversation. As thus connected, the circuit of battery $i$ may be traced from ground at substation A through conductor $c^2$, limb $a$, spring $d$, sleeve $e$, coil $f$, annunciator $h$, battery $i$, annunciator $h'$, coil $f^2$, and thence over limb $a$ of subscriber B to ground. The charging-battery $i$ is thus connected in series with the two connected telephone-lines and serves to charge the microphone-circuit of the two subscribers. The variations of the resistance of the microphone at either substation causes a varying current to flow through the primary of the induction-coil thereat, which induces a current in the secondary coil. Thus the induced current through the coil $c^5$ at substation A passes over limb $a$, windings $ff'$ to the repeating-coil at the central station, and back over limb $b$, thereby inducing currents in windings $f^2 f^3$, which pass over the limbs $a$ and $b$ of telephone-line B and over receiver $c^6$ thereat. Thus the talking-currents are propagated over the two metallic limbs of the telephone-line, while the charging-current passes over the two telephone-lines in series and returns through ground or other common return. When the subscribers are through conversation, the hanging up of the telephone-receiver opens the limb $a$, and thereby stops the flow of current through annunciator $h$, which causes a signal to indicate that the subscribers desire disconnection.

The clearing-out annunciators $h h'$ should have sufficient retardation or impedance to prevent the fluctuation of current in any pair of connected telephone-lines from affecting any other pair of connected lines. Instead of employing the coils of clearing-out annunciators for this purpose separate impedance-coils may be provided, if desired.

In Fig. 2 four subscribers' lines, A, B, C, and D, are illustrated, the lines A B being connected together to form one pair of connected lines, while the lines C and D are connected together to form another pair of connected lines. It will be noted that the common battery $i$ is arranged to supply charging-current to the two pairs of connected lines and the two pairs are in parallel with each other. Likewise any greater number of pairs of connected lines may be connected in circuit with the same battery, and the circuit arrangements and the presence of the impedance-coils $h h' h^2 h^3$ prevent the currents of one pair of lines from interfering with those of another. It will be observed that a plurality of cord connectors are associated with a common battery, one terminal of each cord connector being joined to one pole of the battery, while the other terminal of the cord connector is joined to the other pole of the battery.

In the appended claims I have referred to a source of electricity as adapted to send current over a circuit including in series the third conductor and the two connected telephone-lines, and it will be understood that the said series circuit may include only one limb of each telephone-line or may include the two limbs of each telephone-line, the two limbs of each line being in parallel with each other, while the limbs of the two connected lines are in series. The above expression, as employed in the claims, is intended to comprehend both or either of these structures.

Having described my invention, what I claim as new, and desire to secure by Letters Patent, is—

1. The combination with a pair of telephone-lines, each having two limbs, of a third conductor connected with each telephone-line at the substation, and a source of electricity at the central station adapted to be connected to send current over a circuit including in series said third conductor and the two telephone-lines, substantially as described.

2. The combination with a pair of telephone-lines each having two limbs comprising a metallic talking-circuit, of a charging-circuit including in series a third conductor and one or both limbs of each of the telephone-lines, and a source of electricity adapted to send current over said charging-circuit, substantially as described.

3. In combination, a common battery or source of current, a plurality of pairs of connected telephone-lines deriving current therefrom, one line of each connected pair being connected with one pole of said battery while the other line of the pair is connected with the opposite pole of the battery, said battery being adapted to send current over the connected lines in series, an induction or repeating coil adapted to be interposed between the two connected lines and a retardation or impedance coil connected between each telephone-line and the battery, substantially as described.

4. In combination, a plurality of telephone-lines, a plurality of cord connectors for connecting the lines together and a common battery or source of current, one terminal of each cord connector being connected with one pole of the battery while the other terminal is connected with the opposite pole of the battery, said source of current being adapted to send current over the two connected lines in series, substantially as described.

5. In combination a plurality of telephone-lines, a plurality of cord connectors for connecting the lines together, an induction or repeating coil interposed between the terminals thereof, a common battery or source of current, one terminal of each cord connector being connected with one pole of the battery while the other terminal is connected with the opposite pole of the battery, said battery being adapted to send current over the two connected lines in series, substantially as described.

6. In combination, a plurality of telephone-lines, a plurality of cord connectors for connecting the lines together, an induction or repeating coil interposed between the terminals thereof, a common battery or source of current adapted to send current over the two connected lines in series, one terminal of each cord connector being connected with one pole of the battery while the other terminal is connected with the opposite pole of the battery, and a retardation or impedance coil between each terminal and the battery, substantially as described.

7. In combination, a plurality of telephone-lines each having a metallic talking-circuit and a transmitter-charging circuit comprising one or both limbs of the talking-circuit and a third conductor, a plurality of cord connectors for connecting the lines together, an induction or impedance coil interposed between the terminals thereof, a common battery or source of current adapted to send current over the two connected lines in series, one terminal of each cord connector being connected with one pole of the battery while the other terminal is connected with the other pole of the battery, and a retardation or impedance coil between each of said terminals and the battery, substantially as described.

8. In combination, a plurality of telephone-lines each having a metallic talking-circuit and a transmitter-charging circuit comprising one or both limbs of the talking-circuit and a third conductor, a plurality of cord connectors for connecting the lines together, an induction or repeating coil interposed between the terminals thereof, a common battery or source of current adapted to send current over the two connected lines in series, one terminal of each cord connector being connected with one pole of the battery while the other terminal is connected with the other pole of the battery, and a clearing-out annunciator between each of said terminals and the battery and possessing retardation or impedance, substantially as described.

9. In combination, a plurality of telephone-lines having a metallic talking-circuit and a transmitter-charging circuit comprising one or both limbs of the talking-circuit of each line and a third conductor, a plurality of cord connectors for connecting the lines together, induction or repeating coils interposed between the terminals thereof, the electrical centers of the windings of the induction or repeating coils being connected respectively with the opposite poles of a charging-battery or source of current, and a retardation or impedance coil connected in circuit between said windings and the battery, substantially as described.

10. The combination with a pair of telephone-lines, each having two limbs, of a third conductor connected with each telephone-line at the substation, a source of electricity, and connecting devices at the central station for connecting said source of electricity to send current over a circuit including in series said third conductor and the two telephone-lines, substantially as described.

11. The combination with a plurality of telephone-lines, each having two limbs, of a third conductor connected with each telephone-line at the substation, connecting devices for connecting the telephone-lines in pairs, and a source of electricity common to the plurality of telephone-lines and adapted to be connected to send current over a circuit including in series said third conductor and the two telephone-lines of a connected pair, the several connected pairs of lines being in parallel with each other, substantially as described.

12. The combination with a pair of telephone-lines, each having two limbs comprising a metallic talking-circuit, of a third conductor connected with each line at the substation, telephone apparatus associated with said metallic circuit to send talking-currents thereover, and a charging source of electricity adapted to be connected to send currents over a circuit including in series said third conductor and the two telephone-lines, substantially as described.

13. The combination with a pair of telephone-lines, each having two limbs, of a third conductor, connected with said telephone-lines at the substation, a source of electricity adapted to be connected to send currents over a circuit including in series said third conductor and the two telephone-lines, a microphone and primary of an induction-coil included in said series circuit, and the secondary of an induction-coil included in circuit with the two limbs, substantially as described.

14. The combination with a pair of telephone-lines, each having two limbs, of a third conductor connected with said telephone-lines at the substation, a source of electricity adapted to be connected to send current over a circuit including in series said conductor and the two telephone-lines, a microphone and the primary of an induction-coil in parallel with each other and included in said series circuit and the secondary of an induction-coil in circuit with the two limbs, substantially as described.

15. The combination with the two telephone-lines, each having two limbs, of a third conductor connected with each of said telephone-lines at the substation, the windings of an induction or repeating coil interposed between the limbs of said lines at the central station and a source of electricity connected at the electrical centers of said windings and arranged to send a current over a circuit including in series said third conductor and the two telephone-lines, substantially as described.

16. The combination with a plurality of telephone-lines, each having two limbs, of a third conductor connected with said telephone-lines at the substations, connecting devices for uniting said telephone-lines in pairs, a source of electricity common to the plurality of telephone-lines and adapted to send current over a circuit including in series said third conductor and the two lines of a connected pair, and means for preventing the variations of current on one of said connected pairs from affecting the other connected pairs, substantially as described.

17. The combination with a plurality of telephone-lines, each having two limbs, of a third conductor connected with said telephone-lines at the substations, means for connecting the same in pairs, a source of electricity adapted to be connected to send current over a circuit including in series said third conductor and the two lines of a connected pair, the several connected pairs being in parallel with each other, and a resistance interposed between each line and said source of electricity, substantially as described.

18. The combination with a plurality of telephone-lines, each having two limbs, of a third conductor connected with said telephone-lines at the substations, means for connecting the same in pairs, a source of electricity adapted to be connected to send current over a circuit including in series said third conductor and the two lines of a connected pair, the several connected pairs being in parallel with each other, and a retardation or impedance coil interposed between each line and said source of electricity, substantially as described.

19. The combination with a plurality of telephone-lines, each having two limbs for the talking-circuit, of a third conductor connected with each telephone-line at the substation, means for uniting the limbs of any two lines through a repeating-coil, a source of electricity adapted to send current over a circuit including in series said third conductor and the two telephone-lines of a connected pair, and a retardation or impedance coil interposed between each of said lines and said source of electricity, substantially as described.

In witness whereof I have hereunto subscribed my name in the presence of two witnesses.

WILLIAM W. DEAN.

Witnesses:
W. CLYDE JONES,
PERCY C. GILL.